United States Patent [19]
Sato

[11] Patent Number: 5,235,411
[45] Date of Patent: Aug. 10, 1993

[54] SIGNAL PROCESSING APPARATUS WITH IMPROVED ALIGNMENT SWITCHING BETWEEN COLOR DIFFERENCE SIGNALS

[75] Inventor: Koichi Sato, Tokyo, Japan

[73] Assignee: Asahi Kogaku Kogyo K.K., Tokyo, Japan

[21] Appl. No.: 639,638

[22] Filed: Jan. 10, 1991

[30] Foreign Application Priority Data

Jan. 12, 1990 [JP] Japan ............................ 2-1781[U]

[51] Int. Cl.⁵ .............................................. H04N 9/47
[52] U.S. Cl. .......................................... 358/18; 358/14; 358/11
[58] Field of Search ..................... 358/18, 17, 14, 15, 358/11, 330, 334

[56] References Cited
U.S. PATENT DOCUMENTS 4,623,914 11/1986 Kuribayashi .......................... 358/18
4,910,587 3/1990 Kawasaki ............................. 358/18
4,974,063 11/1990 Kurihara ............................... 358/18

FOREIGN PATENT DOCUMENTS 63-3595  1/1988 Japan .
1-124784 8/1989 Japan .

Primary Examiner—James J. Groody
Assistant Examiner—Sherrie Hsia
Attorney, Agent, or Firm—Sughrue, Mion, Zinn, Macpeak & Seas

[57] ABSTRACT

A signal generator 51 supplies a switching signal to a color difference signal output switch 44 in response to a line index signal LI and/or a horizontal synchronizing signal HD, thus avoiding the outputting of a signal obtained by adding two color difference signals.

12 Claims, 5 Drawing Sheets

SIGNAL PROCESSING APPARATUS WITH IMPROVED ALIGNMENT SWITCHING BETWEEN COLOR DIFFERENCE SIGNALS

BACKGROUND OF THE INVENTION

This invention relates to a signal processing apparatus, preferably used in a dubbing apparatus for recording a picture signal taken by, for example, an electronic camera or the like onto another recording medium.

FIG. 4 is a block diagram showing the configuration of a conventional dubbing apparatus, wherein reference numerals 34 and 36 designate a reproducing device and a recording device, respectively. A signal transmitted from the reproducing device 34 is recorded by the recording device 36.

A signal in which two color difference signals R-Y and B-Y are line-sequentially alternately aligned on every horizontal scanning line as shown in FIG. 5A and a luminance signal Y which has been FM-modulated are reproduced from, for example, a video floppy disk of an electronic still camera and are respectively supplied to terminals 10 and 28 of the reproducing device 34.

The color difference signal supplied to the terminal 10 is delayed by 1 H (H means a horizontal scanning period) by a 1 H delay (DL) circuit 14 (FIG. 5C), further delayed by 1 H by another 1 H delay (DL) circuit 16 (FIG. 5D), and then supplied to an adder 18. The color difference signal which has not been delayed by the 1 H delay circuits 14 and 16 is also supplied to the adder 18 so that this undelayed color difference signal is added to the signal supplied from the 1 H delay circuit 16 (FIG. 5E). The output of the adder 18 is supplied to a contact 20a of a switch circuit 20 as well as to a contact 22b of a switch circuit 22. An output of the 1 H delay circuit 14 is supplied to the other contacts 20b and 22a of the respective switch circuits 20 and 22.

On the other hand, a detection circuit (IDDET) 12 detects the color components on every line of the line-sequentially aligned color difference signals supplied from the terminal 10 and produces a line index signal LI serving as a control signal, FIG. 5B, which, for example, becomes logic "1" for a line on which a color difference signal B-Y is disposed, and logic "0" for a line on which a color difference signal R-Y is disposed. The line index signal is supplied to the switch circuits 20 and 22 as a switching signal. The switch circuits 20 and 22 are switched to the upper contacts 20a and 22a in the drawing when the line index signal is logic "1", and to the lower contacts 20b and 22b when the line index signal is logic "0".

In the output of the 1 H delay circuit 14, as shown in FIG. 5C, a color difference signal R-Y is disposed when the line index signal is logic "1", while a color difference signal B-Y is disposed when the line index signal is logic "0". Further, in the output of the adder 18, as shown in FIG. 5E, a color difference signal B-Y is disposed when the line index signal is logic "1", while a color difference signal R-Y is disposed when the line index signal is logic "0". Accordingly, as shown in FIGS. 5G and 5F, the color difference signals B-Y and R-Y are outputted from the switch circuits 20 and 22 respectively.

When the switch circuit 20 outputs a color difference signal B-Y of the n-th line, the switch circuit 22 outputs a sum signal of color difference signals R-Y of the (n−1)th and (n+1)th lines. Similarly, when the switch circuit 22 outputs a color difference signal R-Y of the n-th line, the switch circuit 20 outputs a sum signal of color difference signals B-Y of the (n−1)th and (n+1)th lines. That is, two color difference signals are made to be simultaneous.

The two simultaneous color difference signals are supplied from terminals 24 and 26 of the reproducing device 34 to contacts 44b and 44a of a switch circuit 44 through terminals 38 and 40 of the recording device 36, respectively.

On the other hand, the FM luminance signal supplied to the terminal 28 is demodulated by a demodulation circuit 30. The demodulated signal is supplied from a terminal 32 of the reproducing device 44 to a modulation circuit 46 through a terminal 42 of the recording device 36. The signal modulated by the modulation circuit 46 is supplied to a not-shown head so as to be recorded onto a not-shown recording medium.

The luminance signal supplied to the terminal 42 is also supplied to a horizontal synchronizing (Hsync) separation circuit 48, which separates a horizontal synchronizing signal HD from the luminance signal and supplies the separated signal HD to a switching-signal generation circuit 50. The latter controls the switching of the switch circuit 44 in synchronization with the supplied horizontal synchronizing signal, so that the contacts 44a and 44b are alternately switched for every line. Accordingly, as shown in FIG. 5I, an output of the switch circuit 44 is a line-sequential signal in which color difference signals R-Y and B-Y are alternately aligned on every line.

This signal is supplied to a not-shown frequency modulator so as to be frequency-modulated, and then supplied to a head so as to be recorded on a recording medium with the luminance signal.

In such an apparatus, however, the switching of the switch circuit 44 does not always correspond to the line index signal, so that there is a possibility that a color difference signal on one line is not selected as shown in FIG. 5I, but instead a sum signal obtained by adding two color difference signals separated from each other by two lines is selected, as shown in FIG. 5H. Thus, when such a sum signal obtained by adding the color difference signals on two lines is recorded, the quality of a picture is deteriorated correspondingly.

The assignee of this application has previously proposed an apparatus as shown in FIG. 6 and in Japanese Utility Model Unexamined Publication No. Hei-1-124784. In this apparatus, the reproducing device 34 and the recording device 36 are provided with terminals 52 and 54, respectively. A line index signal produced from the detection circuit 12 is supplied to the switch circuit 44 through the terminals 52 and 54 as a switching signal in place of the horizontal synchronizing signal. That is, in this apparatus, the switch circuit 44 is switched correspondingly to the line index signal, so that a signal obtained by adding color difference signals on two lines is prevented from being selected.

However, the apparatus shown in FIG. 6 has a disadvantage in that although a correct color difference signal is selected when a line index signal exists in the case where a video signal is recorded from a recording device such as a video camera, two color difference signals cannot be line-sequentially aligned when no line index signal exists.

SUMMARY OF THE INVENTION

This invention has been developed in view of such circumstances, and an object thereof is to provide an apparatus in which color signals can be line-sequentially outputted even when no line index signal exists.

According to the invention, the signal processing apparatus comprises: a horizontal synchronizing separation circuit for separating a horizontal synchronizing signal from a luminance signal; a switch circuit for selectively outputting one of a plurality of color signals applied thereto; and a control circuit for controlling said switch circuit in response to an output from said horizontal synchronizing separation circuit. The control circuit receives a control signal which is used to make to be simultaneous the plural color signals which are line-sequentially transmitted, and the control circuit controls the switching operation of the switch circuit according to at least one of the control signal and an output from the horizontal synchronizing separation circuit.

Further, according to the present invention, the signal processing circuit comprises: a first terminal for receiving line index signals corresponding to respective line positions of two line-sequentially transmitted color-difference signals; a second terminal for receiving an input of a luminance signal; third and fourth terminals for respectively receiving the two color difference signals made to be simultaneous; a horizontal synchronizing separation circuit for separating a horizontal synchronizing signal from the luminance signal supplied from the second terminal; and a switch circuit for line-sequentially producing the two simultaneous color difference signals respectively supplied from the third and fourth terminals correspondingly to the line index signal when the line index signal is being supplied from the first terminal, or correspondingly to the horizontal synchronizing signal separated by the horizontal synchronizing separation circuit when the line index signal is not being supplied from the first terminal.

Furthermore, the signal processing apparatus according to the present invention is used in a dubbing apparatus, in which a first circuit for line-sequentially producing color difference signals at a recording side is controlled according to a control signal to be applied to a circuit for making color difference signals to be simultaneous at a reproduction side, when both luminance and simultaneous color difference signals are subjected to dubbing. The first circuit is controlled according to said control signal when said control signal is being supplied whereas the first circuit is controlled according to a synchronizing signal separated from the luminance signal when no control signal is being supplied.

In the signal processing apparatus having such a configuration as described above, the switch circuit is switched in accordance with both the line index signal and the horizontal synchronizing signal. Accordingly, not only is the correct switching operation always carried out when a line index signal exists, but two color difference signals can be line-sequentially outputted even when no line index signal exists.

DETAILED DESCRIPTION OF THE PREFERRED EMBODIMENT

Figure 1:
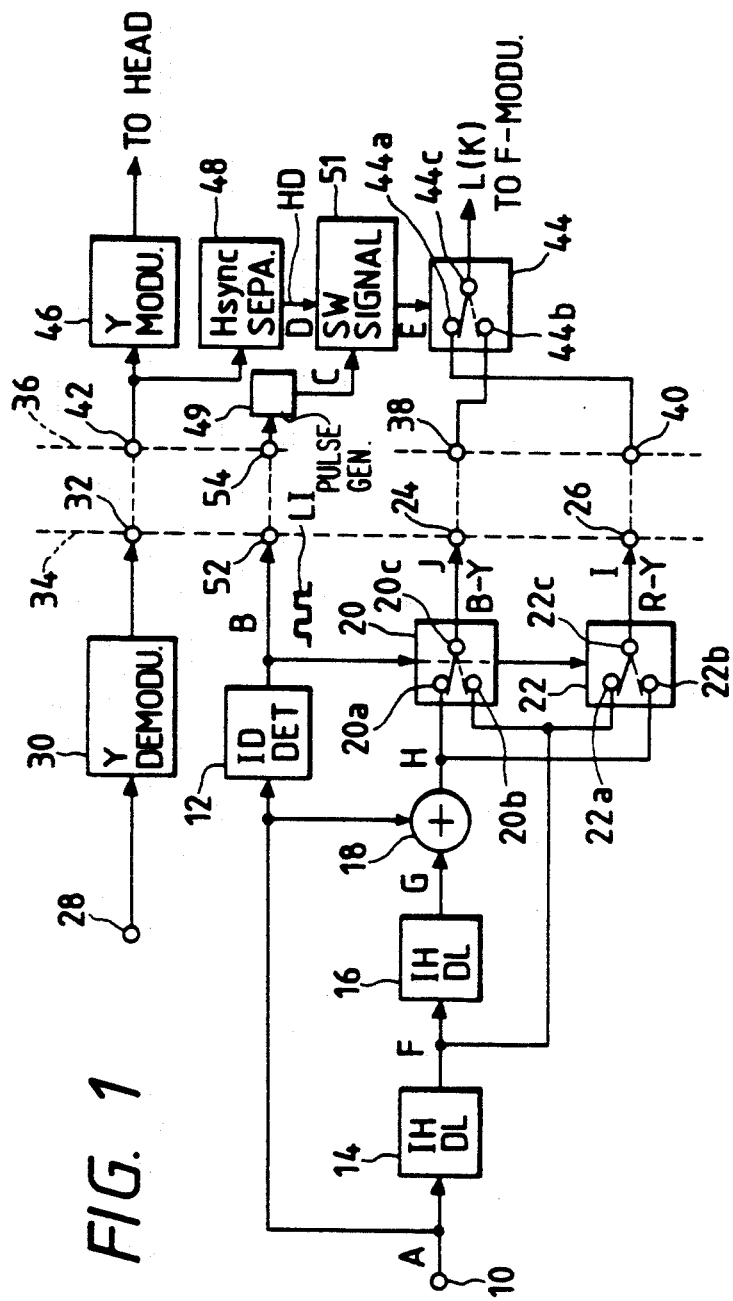
FIG. 1 is a block diagram showing an embodiment of a dubbing apparatus to which the signal processing apparatus of this present invention is supplied.
Figure 4:
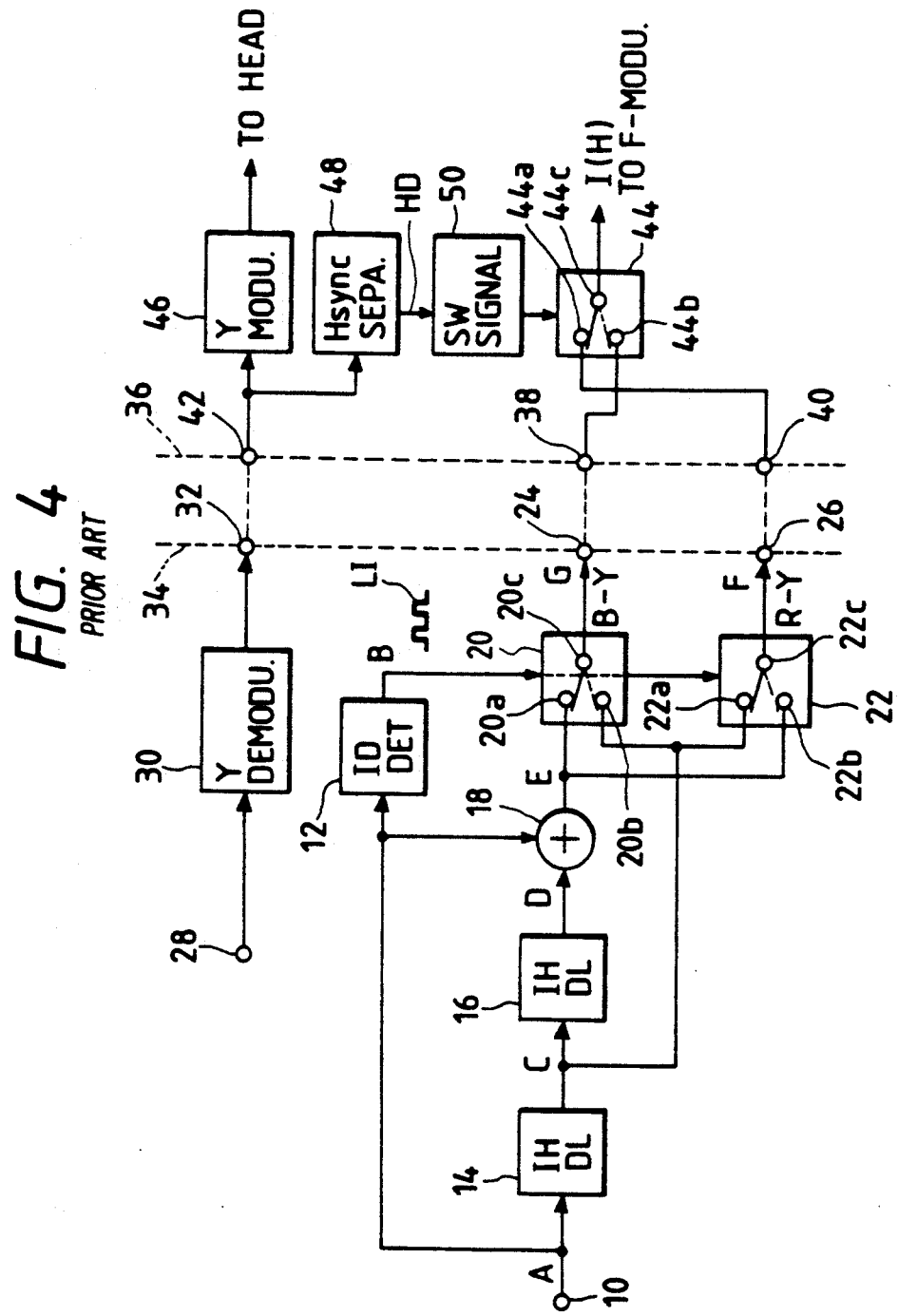
FIGS. 4 and 6 are block diagrams showing examples of conventional dubbing apparatuses.
Figures 5A, 5B, 5C, 5D, 5E, 5F, 5G, 5H, 5I:
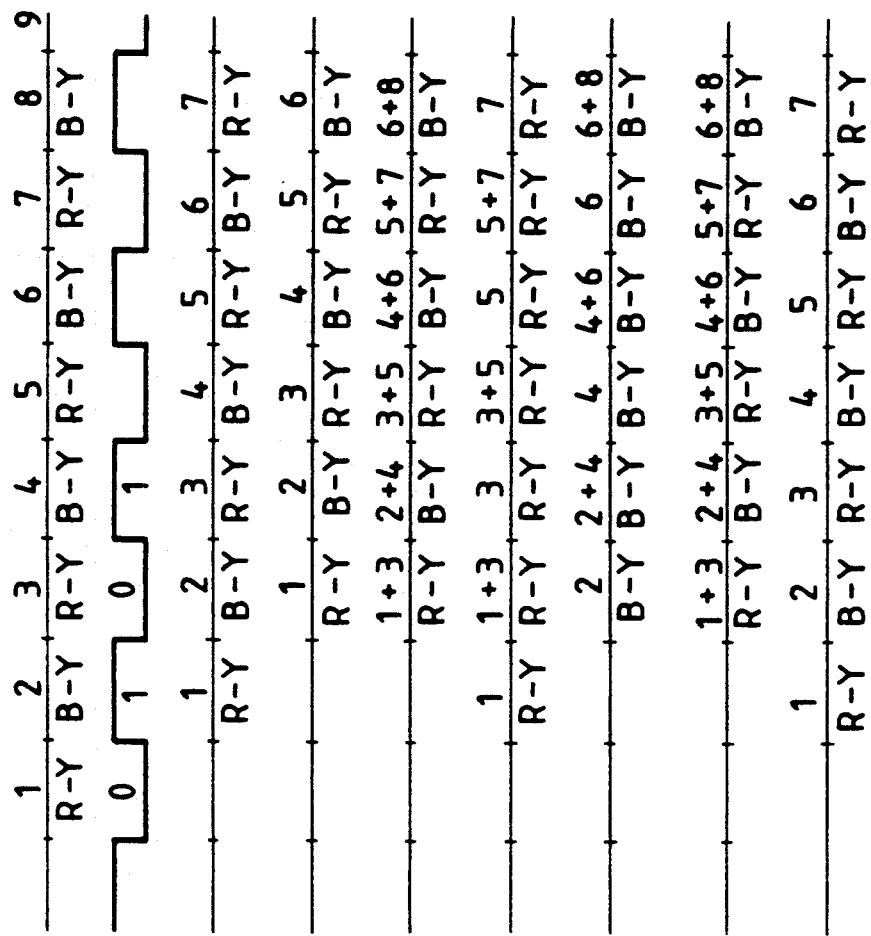
FIGS. 5A-5I are timing charts for explaining the operation of the examples of FIGS. 4 and 6.
Figure 6:
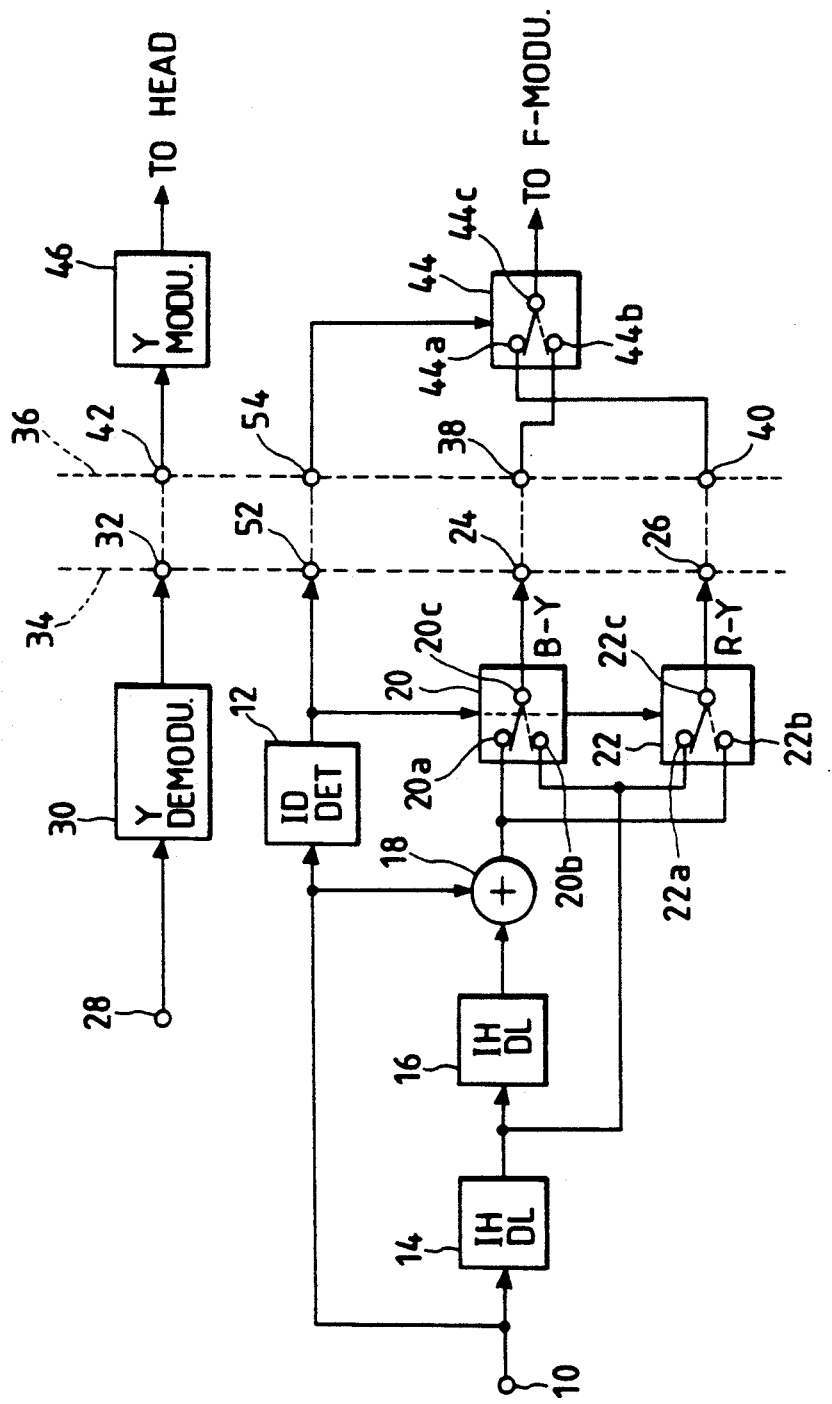

FIG. 1 is a block diagram showing an embodiment of the dubbing apparatus to which the signal processing apparatus of this present invention is applied. The portions corresponding to those in FIGS. 4 and 6 are referenced correspondingly.

In the signal processing apparatus 36 of this invention, a pulse generation circuit 49 is connected to a terminal 54, and an output of the pulse generation circuit 49 is supplied to a switching-signal generation circuit 51. An output of the horizontal synchronizing separation circuit 48 is also supplied to the switching-signal generation circuit 51.

Figure 2:
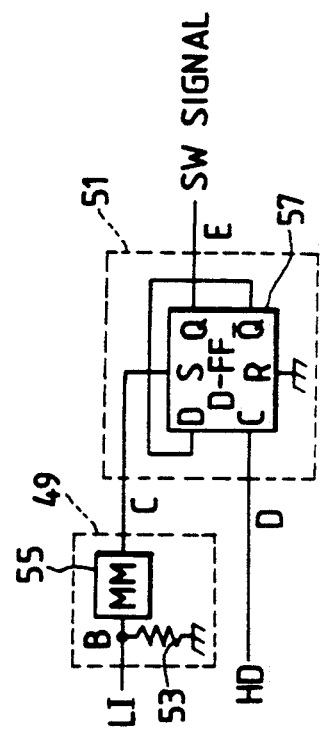
FIG. 2 is a block diagram showing a specific configuration of the pulse generation circuit and the switching-signal generation circuit in FIG. 1.

FIG. 2 is a block diagram showing the configuration of the pulse generation circuit 49 and the switching-signal generation circuit 51. The pulse generation circuit 49 is constituted by a monostable multivibrator 55 and a resistor 53 for connecting the input of the monostable multivibrator 55 to ground, while the switching-signal generation circuit 51 is constituted by a D-type flip-flop 57. A horizontal synchronizing signal produced from the horizontal synchronizing separation circuit 48 is supplied to the clock terminal C of the flip-flop, its output terminal $\overline{Q}$ is connected to its data terminal D, and its output at terminal Q is supplied to the switch circuit 44 as a switching signal. The configuration of the other components is the same as that in the case of FIG. 4.

Figure 3:
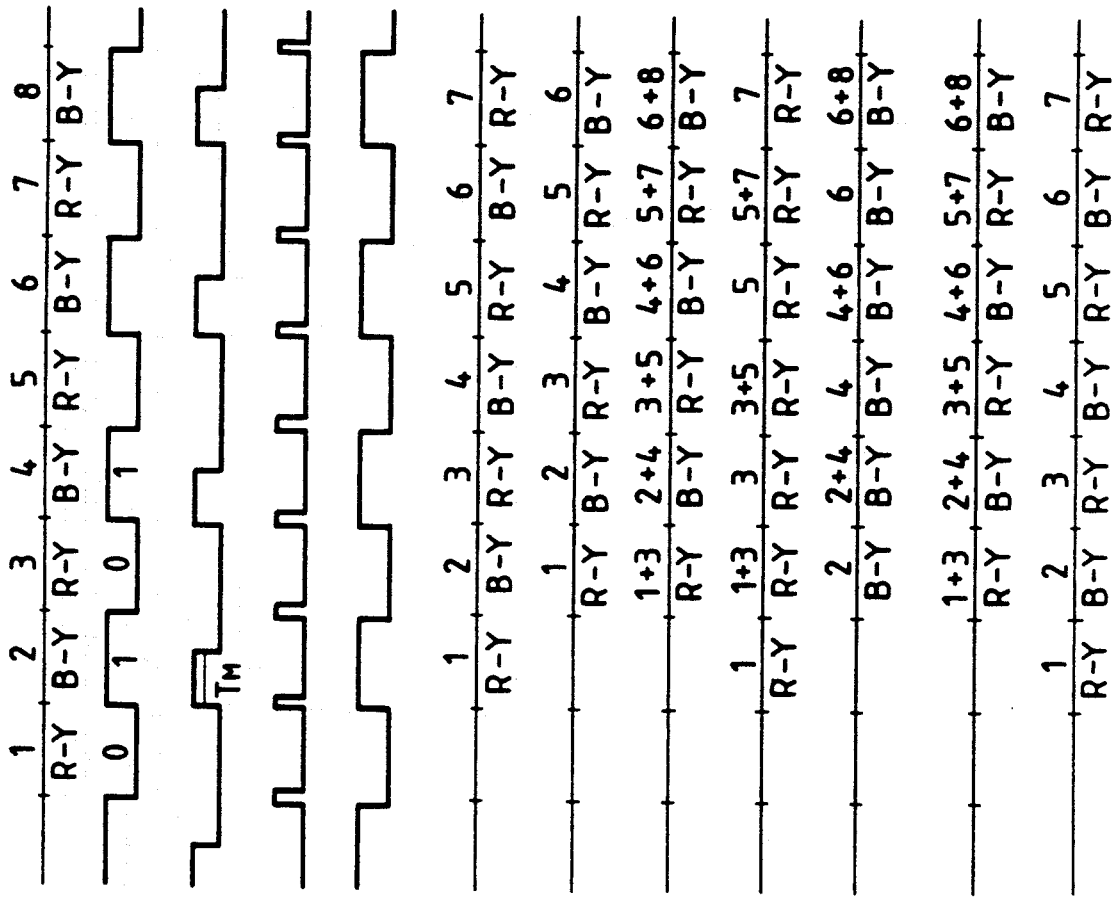
FIGS. 3A-3L are timing charts for explaining the operation of the embodiment of FIG. 1.

Referring to FIGS. 3A-3L a line-sequential color difference signal (FIG. 3A) received by the terminal 10 is supplied to the detection circuit 12 in which a line index signal (FIG. 3B) is generated. The signal supplied to the terminal 10 is also delayed by 2 H by 1 H delay circuits 14 and 16 (FIG. 3G), and the delayed signal is supplied to the adder 18. The adder 18 adds this signal to the signal supplied from the terminal 10 (FIG. 3H) and supplies the sum signal to one contact of each respective switch circuit 20 and 22. An output of the 1 H delay circuit 14 (FIG. 3F) is supplied to the other contact of the switch circuits 20 and 22. The switch circuits 20 and 22 respectively select one and the other color difference signals correspondingly to the line index signal produced by the detection circuit 12, and supply their selected signals to terminals 24 and 26, respectively (FIGS. 3J and 3I).

The color difference signals outputted from the terminals 24 and 26 are supplied to contacts 44b and 44a of the switch circuit 44 through terminals 38 and 40, respectively, and the line index signal is supplied to the terminal 54 through a terminal 52. Further, the luminance signal Y supplied from terminal 28 and FM-demodulated by a demodulator 30 is supplied to the modulator 46 and the horizontal synchronizing separation circuit 48 through terminals 32 and 42.

The operation described above is the same as that of FIGS. 4 and 6.

Whenever the leading edge of the line index signal (FIG. 3B) is supplied to the terminal 54, the monostable multivibrator 55 is triggered to generate a pulse having a width of TM (FIG. 3C). The width TM is set to a value shorter than the length of a half period (one line) of the line index signal. The pulse is supplied to the set terminal S of the D-type flip flop 57.

On the other hand, the horizontal synchronizing signal (FIG. 3D) separated by the horizontal synchronizing separation circuit 48 is supplied to the clock terminal C of the D-type flip flop 57.

In the D-type flip flop 57, the trigger through the set terminal S is performed prior to the trigger through the clock terminal C. Accordingly, whenever a pulse is supplied from the monostable multivibrator 55 in synchronism with the leading edge of the line index signal, the D-type flip flop 57 is set so that the outputs Q and $\overline{Q}$ become logic "1" and "0", respectively. Thereafter, when the horizontal synchronizing signal is supplied to the clock terminal C, the output Q is inverted into logic "0" (FIG. 3E) because the logic "0" of the output $\overline{Q}$ is supplied to the data terminal D. The above operation is repeated successively. Accordingly, in the case where the line index signal exists, a switching signal having a logic value corresponding to the line index signal is supplied to the switching circuit 44. Thus, correct switching is always performed, so that two color difference signals are line-sequentially alternately aligned on every line as shown in FIG. 3L and the signal is outputted. In other words, it never happens that a sum signal obtained by adding the two color difference signals is selected and outputted as shown in FIG. 3K.

On the other hand, in the case where no line index signal exists, a logic "0" is always supplied to the set terminal S of the D-type flip flop 57. In this case, therefore, the D-type flip flop 57 functions as a T-type flip-flop, so that the logic of the output Q is inverted whenever the horizontal synchronizing signal is supplied. As a result, the switch circuit 44 outputs the signal as shown in FIG. 3L.

Although R-Y and B-Y are used as color difference signals in the above description, two desired signals of G-Y, R-Y, and B-Y may be used. Further, two color signals I and Q may be used in place of the color difference signals. Accordingly, it can be considered that the color difference signals include color signals.

As described above, in the signal processing apparatus according to the present invention, switching is performed in accordance with both the line index signal and the horizontal synchronizing signal with priority of the line index signal, so that a correct line-sequential output can be surely obtained.

What is claimed is:

1. A signal processing apparatus comprising:
    a horizontal synchronizing separation circuit for separating a horizontal synchronizing signal from a luminance signal;
    a switch circuit for selectively outputting one of a plurality of color signals applied thereto in accordance with a switching signal; and
    a control circuit receiving said horizontal synchronizing signal and a control signal which is used to render simultaneous said plurality of color signals which have been line-sequentially reproduced, and said control circuit generating said switching signal in accordance with the relative timing of said control signal and said horizontal synchronizing signal when said control signal is provided to said control circuit and in accordance with only said horizontal synchronizing signal when said control signal is not being provided to said control circuit.

2. A signal processing apparatus comprising:
    a first terminal (54) for receiving line index signals corresponding to respective line positions of two line-sequentially reproduced color-difference signals;
    a second terminal (42) for receiving a luminance signal;
    third and fourth terminals (38, 40) for respectively receiving simultaneous color difference signals including said two color difference signals made to be simultaneous;
    a horizontal synchronizing separation circuit (48) for separating a horizontal synchronizing signal from said luminance signal supplied from said second terminal; and
    circuit means including a switch circuit (44) for line-sequentially producing said two simultaneous color difference signals respectively supplied from said third and fourth terminals, said circuit means producing said color difference signals in accordance with the relative timing of said line index signals and said horizontal synchronizing signal when said line index signals are being supplied from said first terminal, and in accordance with only said horizontal synchronizing signal separated by said horizontal synchronizing separation circuit when said line index signals are not being supplied from said first terminal.

3. A signal processing apparatus according to claim 2, wherein said circuit means comprises:
    a pulse generator (49) coupled to said first terminal; and
    a switching signal generation circuit (51) responsive to both said pulse generator and said horizontal synchronizing separation circuit for supplying a switching signal to the switch circuit.

4. A signal processing apparatus for use in a dubbing apparatus for dubbing a signal including luminance and color difference signals, said color difference signals having been line-sequentially produced at a reproduction side and converted to simultaneous color difference signals in accordance with a first control signals, said apparatus including a first circuit at a recording side for receiving said simultaneous color difference signals and converting them to line-sequential color difference signals in accordance with a recording side control signal, said signal processing apparatus including a second circuit for separating a synchronizing signal from said luminance signal, said apparatus further including a control circuit for generating said recording side control signal in accordance with the relative timing of said first control signal and said synchronizing signal when said first control signal is being supplied to said recording side, and said control circuit generating said recording side control signal in accordance with only said synchronizing signal when no first control signal is being supplied.

5. A signal processing apparatus comprising:
    a first terminal (54) for receiving line index signals corresponding to respective line positions of two line-sequentially reproduced color-difference signals;
    a second terminal (42) for receiving a luminance signal;

third and fourth terminals (38, 40) for respectively receiving simultaneous color difference signals including said two color difference signals rendered simultaneous in accordance with said line index signals;

a horizontal synchronizing separation circuit (48) for separating a horizontal synchronizing signal from said luminance signal supplied from said second terminal;

circuit means including a switch circuit (44) for line-sequentially producing said two simultaneous color difference signals respectively supplied from said third and fourth terminals, in accordance with said line index signals when said line index signals are being supplied from said first terminals, or in accordance with said horizontal synchronizing signal when said line index signals are not being supplied from said first terminal;

a pulse generator (49) coupled to said first terminal; and a switching signal generation circuit (51) responsive to both said pulse generator and said horizontal synchronizing separation circuit for supplying a switching signal to the switch circuit.

6. A signal processing apparatus according to claim 5, wherein the pulse generator is a monostable multivibrator, and the switching signal generation circuit is a flip-flop.

7. A signal processing apparatus according to claim 1, wherein said control circuit generates said switching signal upon receiving said horizontal synchronizing signal and in accordance with the first to arrive of said control signal and said horizontal synchronizing signal.

8. A signal processing apparatus according to claim 2, wherein said circuit means said color difference signals upon receiving said horizontal synchronizing signal and in accordance with the first to arrive of said line index signals and said horizontal synchronizing signal.

9. A signal processing apparatus according to claim 4, wherein said control circuit generates said recording side control signal upon receiving said synchronizing signal and in accordance with the first to arrive of said first control signal and said synchronizing signal.

10. A signal processing apparatus according to claim 1, wherein said control circuit comprises a flip-flop receiving said control signal at a set terminal thereof and receiving said horizontal synchronizing signal at a clock terminals, with an output of said flip-flop determining said switching signal.

11. A signal processing apparatus according to claim 2, wherein said circuit means comprises a flip-flop receiving said line index signals at a set terminal thereof and receiving said horizontal synchronizing signal at a clock terminal, with an output of said flip-flop controlling said switch circuit.

12. A signal processing apparatus according to claim 4, wherein said control circuit comprises a flip-flop receiving said first control signal at a set terminal thereof and receiving said synchronizing signal at a clock terminal, with an output of said flip-flop determining said recording side control signal.

* * * * *